Jan. 31, 1967   P. P. SCHAUFFLER   3,302,203
ELECTRONIC CHANNEL GUIDANCE SYSTEM
Filed Dec. 23, 1964   8 Sheets-Sheet 3

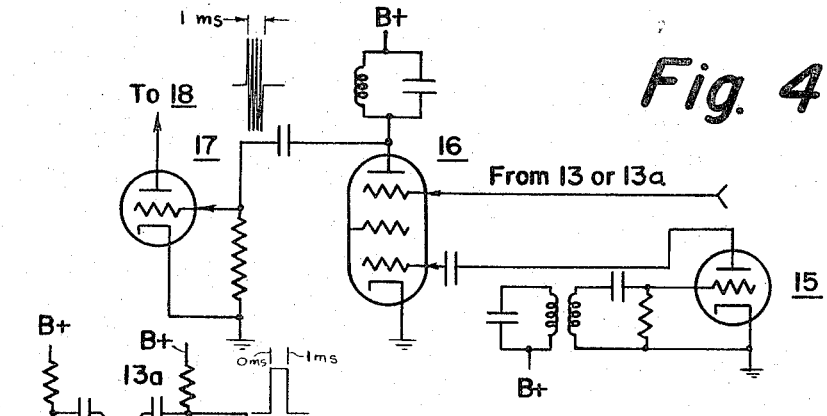
Fig. 4
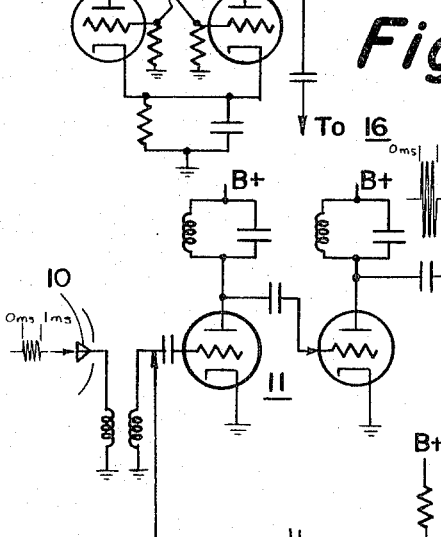
Fig. 4a
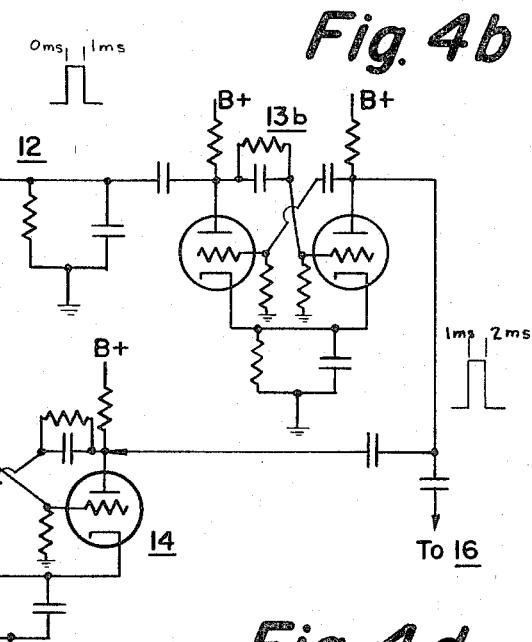
Fig. 4b
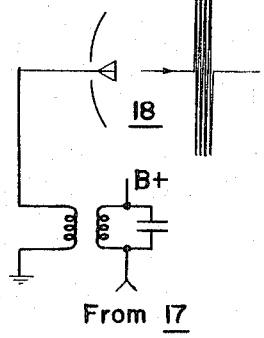
Fig. 4c   Fig. 4d

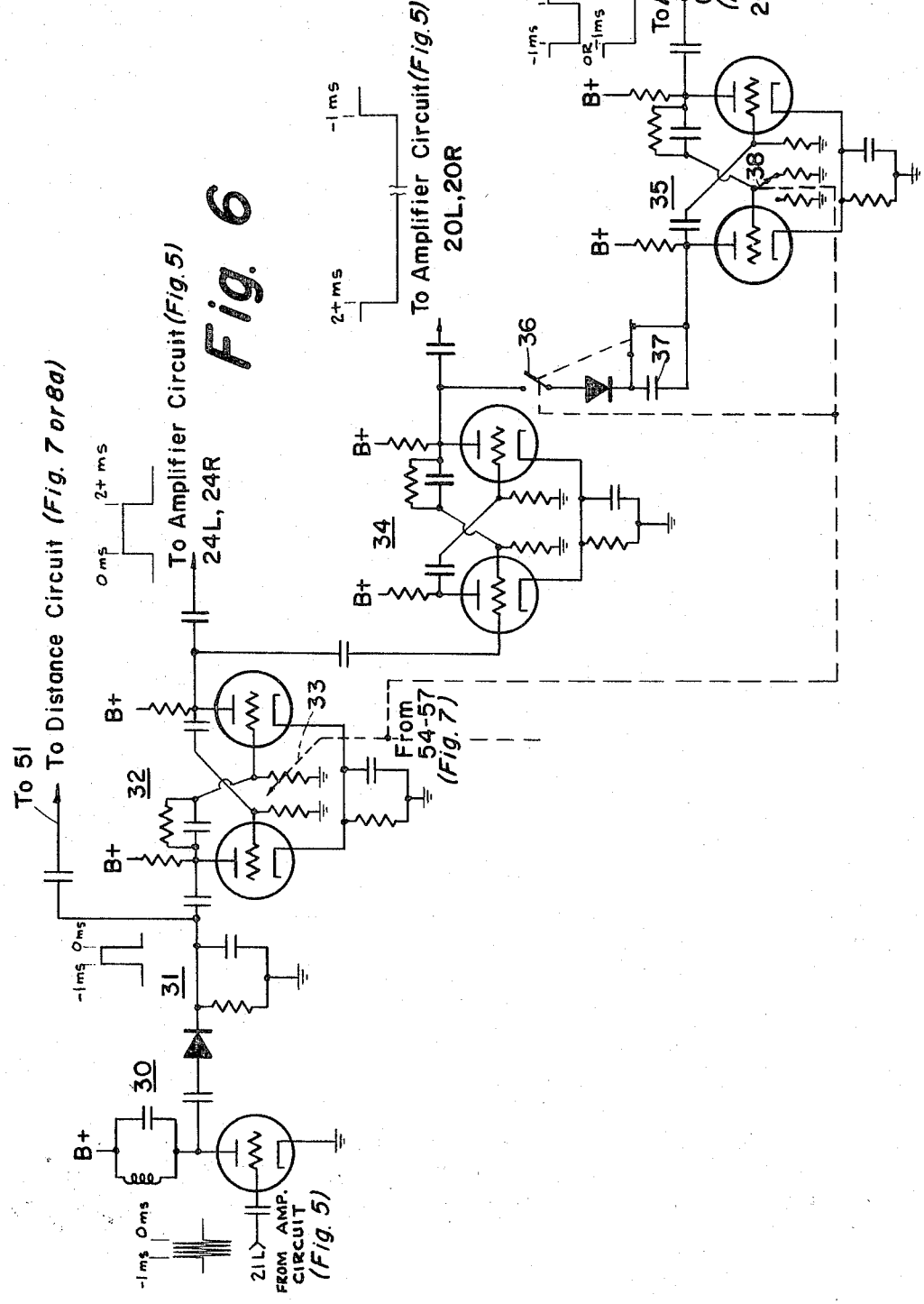

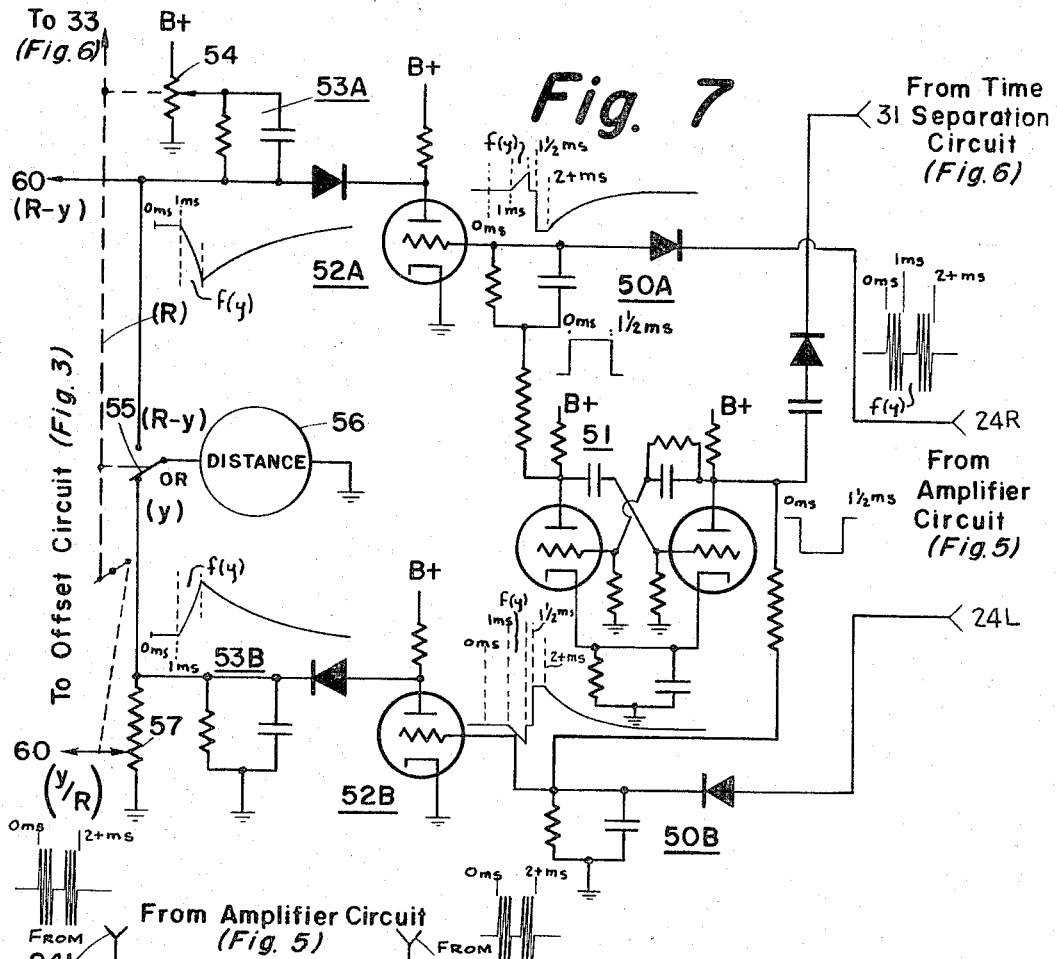
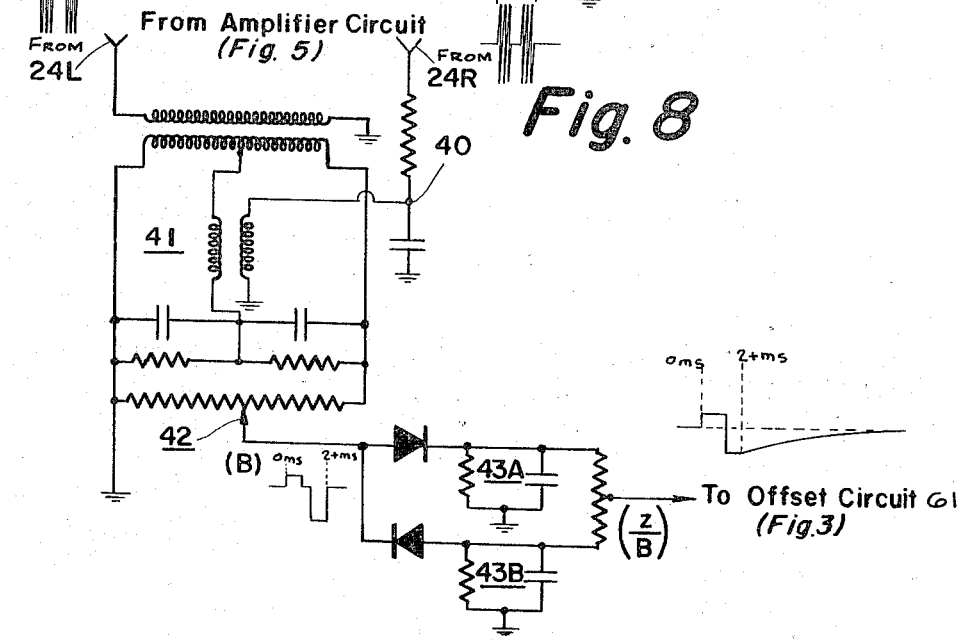

United States Patent Office 3,302,203
Patented Jan. 31, 1967

3,302,203
ELECTRONIC CHANNEL GUIDANCE SYSTEM
Peter P. Schauffler, 101 W. Springfield Ave.,
Philadelphia, Pa. 19118
Filed Dec. 23, 1964, Ser. No. 420,548
14 Claims. (Cl. 343—112)

This invention relates to navigation of vessels in narrow channels and sea lanes under conditions of reduced visibility and particularly relates to methods and systems for automatically indicating in the pilot house at all times the location of a vessel as it progresses along a channel.

There has long been recognized the need of providing better information on the position of ships with respect to their channels, particularly in crowded ocean approaches and in rivers and bays leading to inland ports. Prior arrangements involving radio direction finders or underwater signaling systems have left much to be desired. Their objective has generally been to maintain a heading toward or away from a single point; but a vessel can wander from its channel even though the bow or stern be continually pointed toward the source of a homing signal. Where such systems have involved radar, the costs and complications of installation and operation have severly restricted their adoption.

In my copending United States patent application Serial No. 321,477 for "Electronic Channel Guidance System" filed November 5, 1963, there is set forth a phase-measurement method and means for determining at all times aboard a vessel its own position and action as it navigates a narrow channel. According to the method and means of that application, phase-locked energies of different frequencies are radiated from range stations at each end of the extended channel center line, received by antennas on each bridge wing of the vessel, and subjected to phase comparisons in the pilot house to register the vessel's attitude, true speed, progress along the range, and offset from the channel center line.

The general objective of the present invention is similar to that set forth in the earlier application. The method described hereinafter provides for continuous determination of the vessel's position in the channel but does not provide for information, as did the earlier application, on the vessel's attitude and speed.

The present invention makes use of the same method as in the earlier application for simultaneous determination of the relative bearings of fore and aft range stations by phase comparisons of energy received from said stations at points laterally spaced between or on opposite sides of the vessel; claims generic to this subject matter common to both applications appear in the earlier application rather than here.

The present invention employs a pulse-arrival-time-comparison method for determination of the vessel's distance from the range stations rather than the counting of phase-coincidence points in the phase-locked energies of the range stations as set forth in the earlier application.

In the present invention, radio range stations may be located at every place where the channel undergoes a substantial change of direction and are operated in pairs. The paired signals of a range are detected aboard ship by laterally-spaced receivers. As long as the vessel is on course, the signals are received simultaneously. However, when the vessel turns or moves out of position, the signals arrive at one receiver earlier than at the other; and the difference in the arrival time is utilized together with distance information to provide a visual indication of the vessel's progress and offset from the base line between the range stations.

In accordance with this invention, time-separated signals are transmitted from fore and aft range stations. Lateral phase-comparison arrangements on the vessel continuously determine the simultaneous relative bearings of the two stations; and a longitudinal timing arrangement continuously registers the vessel's distance from each of the stations. By combining the distance to and the bearing of each station, the system continuously indicates the lateral offset of the vessel from the base line connecting the two stations and the direction in which the vessel must turn to achieve or maintain the desired offset.

This system overcomes the visual navigation problems ordinarily imposed by fog, mist, haze, snow, rain and darkness; and vessels can proceed through channels of considerable complexity with full knowledge of their position at all times. The system provides a combination of high accuracy, simplicity, economy, convenience of presentation, and portability of receiver-indicator equipment. This system, furthermore, operates effectively in conjunction with both shipborne and shore-based radar and with bridge-to-bridge radio-telephone systems. It provides the information necessary for sure navigation of the channel while these other systems provide information regarding the movements of other traffic.

For further objects and advantages of the invention and additional features thereof, reference is to be had to the following detailed description and to the accompanying drawings in which.

Figure 5:
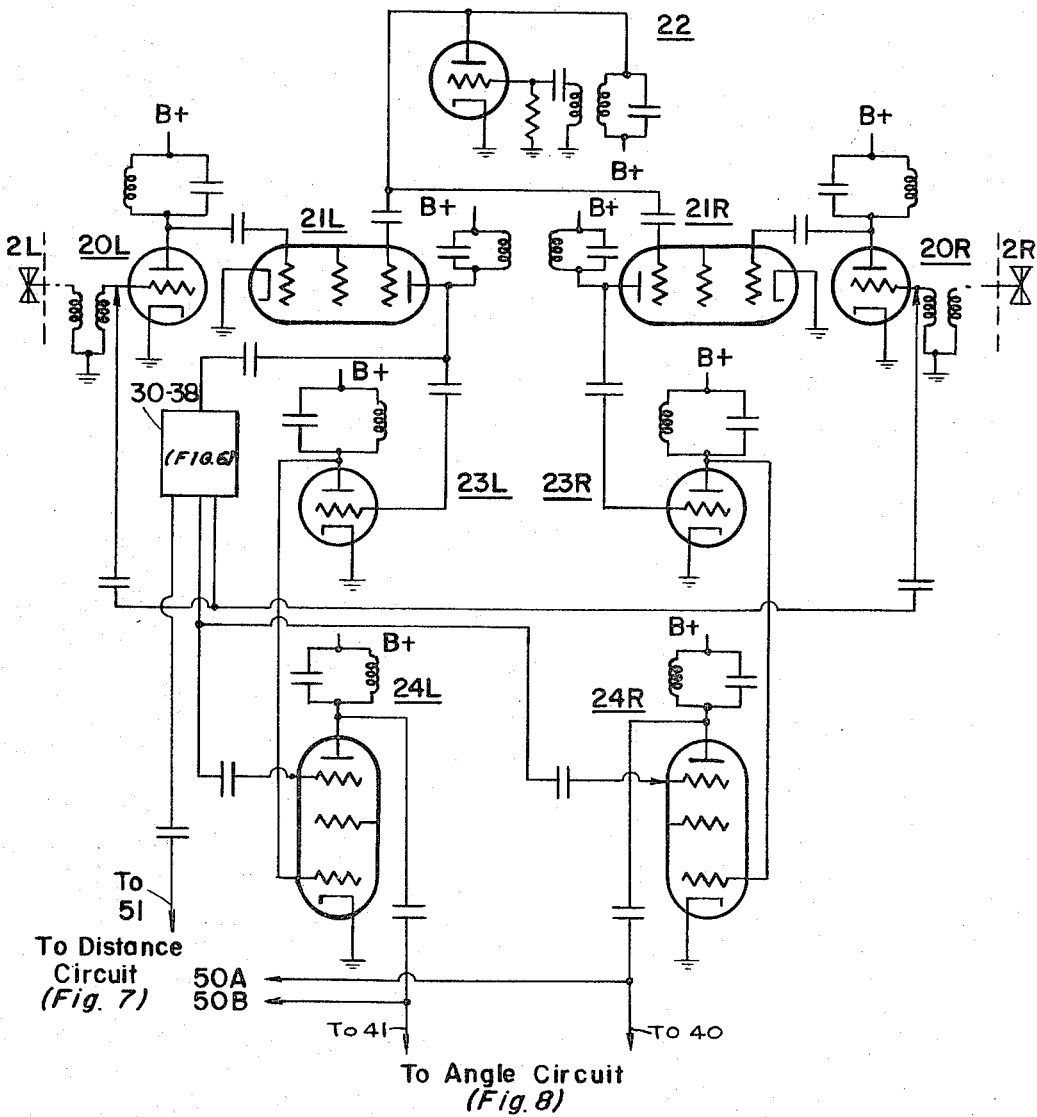
Figure 8A:
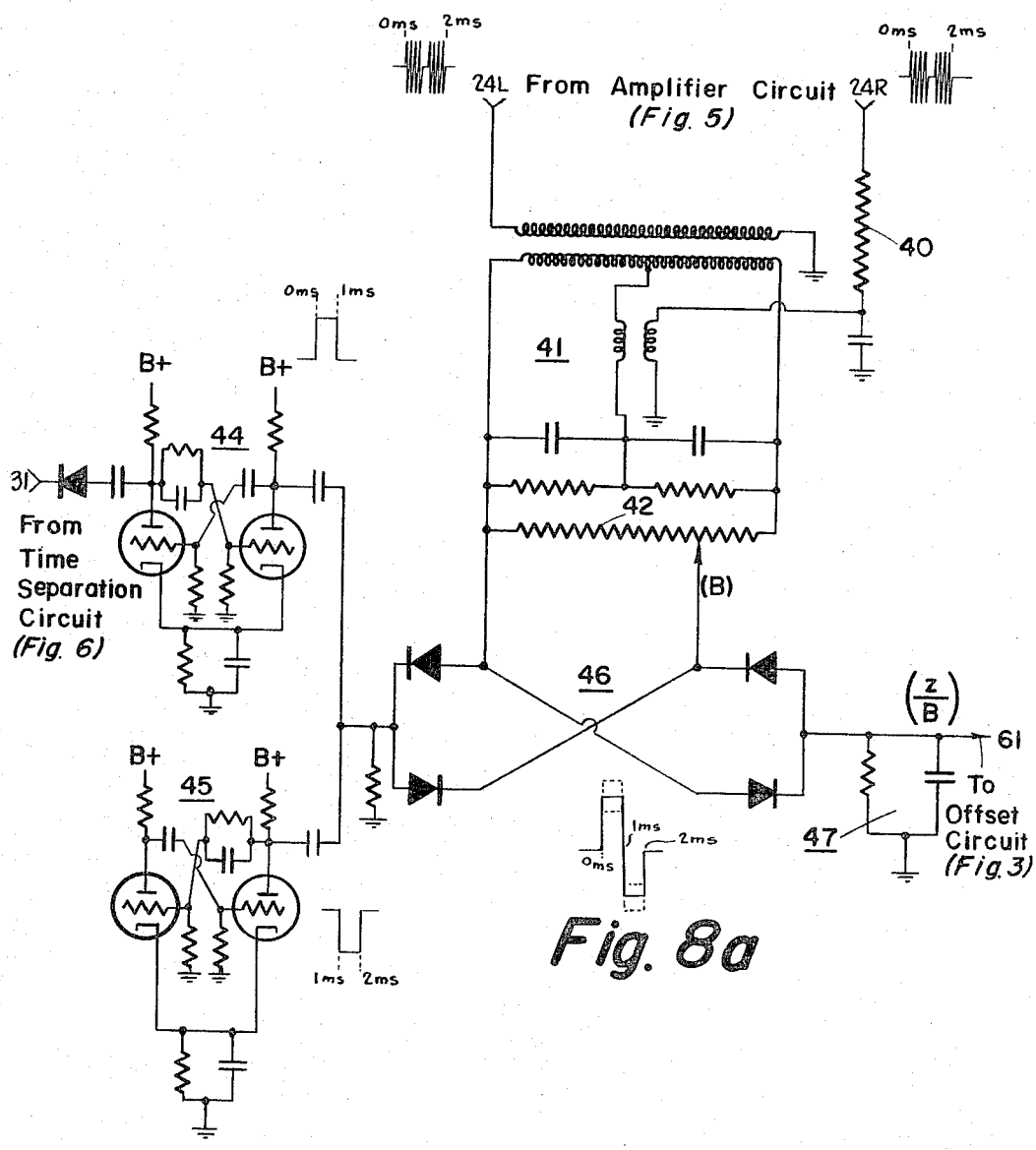

FIG. 4 schematically illustrates suitable circuit elements of the radio range station transmitters;

FIGS. 4a, 4b schematically illustrate suitable modulation circuitry for these transmitters;

FIGS. 4c, 4d schematically illustrate suitable master and slave transmitter antennas;

FIG. 5 schematically illustrates suitable circuit elements of amplifier units in the radio receiver-indicator;

FIG. 6 schematically illustrates suitable circuit elements of the time separation unit in the radio receiver-indicator;

FIG. 7 schematically illustrates suitable circuit elements of the distance indicator unit in the radio receiver-indicator;

FIG. 8 schematically illustrates suitable circuit elements of the bearing angle unit in the radio receiver-indicator; and FIG. 8a schematically illustrates suitable circuit elements of the modified bearing angle unit in the radio receiver-indicator for the adjacent-beacon configuration.

Figure 1:
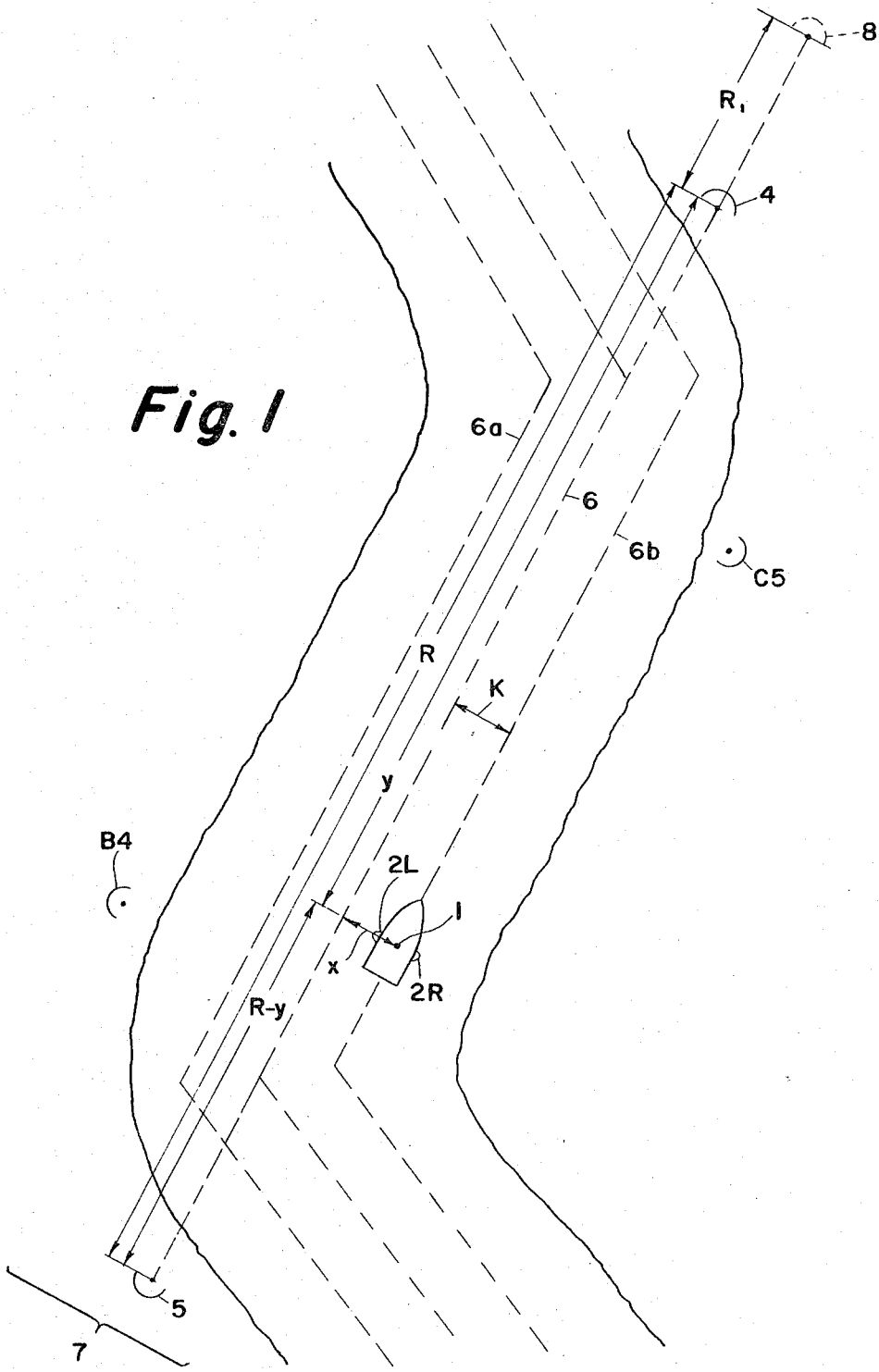
FIG. 1 is an explanatory figure referred to in discussion of the general geometric relationships between vessel location and radio range station locations for a typical channel range.
Figure 2:
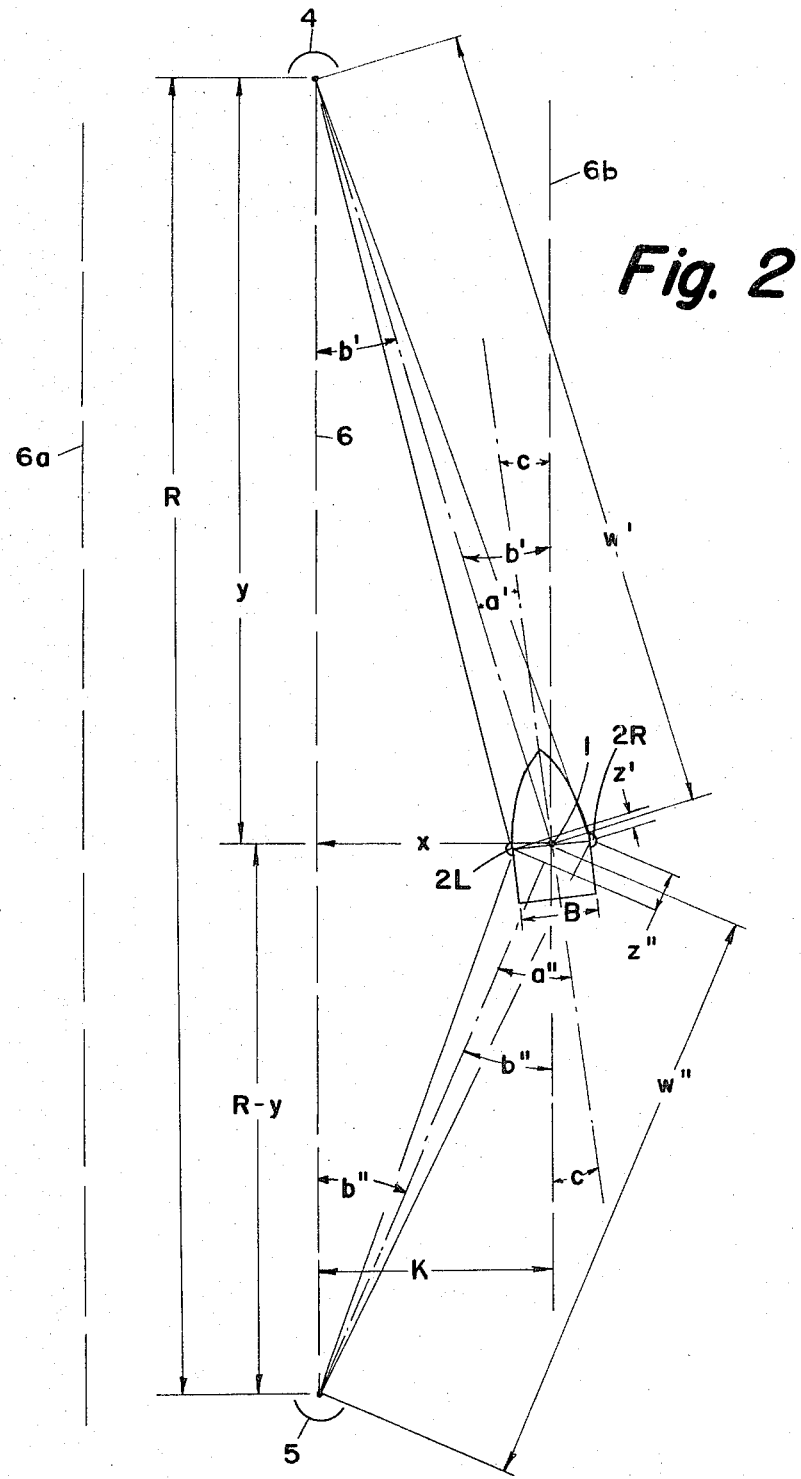
FIG. 2 is an explanatory figure referred to in discussion of the detailed geometric relationships between vessel location and radio transmitter and receiver antenna locations.

Referring first to FIGS. 1 and 2 to describe the method employed in this system: the range stations 4, 5 consist in each case of radio transmitters located on land (or on towers, pilings or buoys extending above the water surface), one at each end of the projected base or center line 6 of each channel range 7. Where the channel is so equipped, one station in each pair makes use of the light-beacon range stations operated by the United States Coast Guard; and the existence of towers and power sources for these light ranges greatly simplifies the installation of the radio range stations. The achievable accuracy of the offset indication is such that channel traffic in both the inbound and outbound lanes 6a and 6b uses the same channel center line 6 as a reference, navigating in each case to maintain a specified offset K to the right of the center line in the direction of travel.

The ship's location at all times is defined by the distances $y$, $R-y$ from the fore and aft range stations 4, 5 measured along the center or base line 6 and by the lateral offset $x$ from the channel center line 6.

Determining on board the vessel its distance $y$ and $R-y$ from the fore and aft range stations 4 and 5 respectively involves a measurement of the relative time of arrival of pulsed energy from the two stations.

As by circuits described hereafter, the end of each pulse of energy from the master station is used to trigger a "reflected" pulse from the slave station. The time interval between the end of the master station pulse and beginning of the slave station pulse as received aboard the vessel, multiplied by radio velocity, is equal to twice the vessel's distance from the slave station. This time interval is translated into a voltage and applied to an appropriately calibrated distance meter.

Determining on board the vessel its lateral offset from the base line between the range stations involves a continuous combination of the above distance information and the algebraic sum of the differences in distance of the shipboard receiving antennas from each of the transmitter antennas for that range.

Referring to FIG. 2: $x$, $y$, and $R-y$ are defined as above; $a'$ and $a''$ are the relative bearings of the fore and aft range stations, respectively; B equals the distance (essentially the vessel's beam) between the laterally-spaced receiving antennas 2L, 2R disposed, for example, on the bridge wings on opposite sides of the vessel and connected to an indicator in the pilot house 1; $c$ represents the angle between the vessel's heading and the lane center line 6b (and channel center line 6); $w'$ and $w''$ are the straight-line distances from the pilot house to the fore and aft range stations 4 and 5 respectively; and $z'$ and $z''$ represent the difference in distance of the two receiving antennas 2L and 2R from the fore and aft range stations 4 and 5, respectively. These latter are represented by voltages produced by phase comparisons as by means described hereinafter.

It can be seen from FIG. 2 that $$b' = a' + c \text{ and } b'' = a'' - c$$

and therefore that $$b' + b'' = a' + a''$$

It can also be seen that $$x = w' \sin b' \text{ and } x = w'' \sin b''$$

and also that $$y = w' \cos b' \text{ and } R - y = w'' \cos b''$$

For the typical range configuration, where the perpendicular distance between the center line 6 and the lane line 6a or 6b is only a minor fraction of the distance between range stations and the angles $b'$ and $b''$ are therefore small, these latter relationships can be approximated as:

$$x \doteq w'b'; \quad x \doteq w''b''$$

$$y \doteq w' \text{ and } R - y \doteq w''$$

Therefore $$b' + b'' \doteq \frac{x}{w'} + \frac{x}{w''}$$

and $$\doteq x \frac{(w' + w'')}{w'w''} \doteq x \frac{R}{y(R-y)} \doteq a' + a''$$

$$x \doteq \frac{y(R-y)(a' + a'')}{R}$$

As can also be seen from FIG. 2, $$z' = B \sin a' \text{ and } z'' = B \sin a''$$

For the small relative bearing angles that are characteristic of the typical channel range, these relationships can be approximated as $$z' \doteq Ba' \text{ and } z'' \doteq Ba''$$

If the algebraic sum of $z'$ and $z''$ is represented as $z$ (when measuring $a'$ to the left and $a''$ to the right respectively from the vessel's center line), it can be seen that $a' + a'' \doteq z/B$ and therefore, finally, that $$x \doteq yz(R-y)/RB$$

As by means later herein described, the algebraic sum of the $z'$ and $z''$ voltages described above (divided by B through a non-linear potentiometer set by hand for the characteristics of the vessel installation) is combined with the voltages produced by the distance circuit as described above to produce, through a simple computer, a voltage which continuously reflects the relationship $$yz(R-y)/RB$$

and thus represents the vessel's lateral offset from the channel center line; and this voltage is applied to an appropriately calibrated offset meter.

Figure 3:
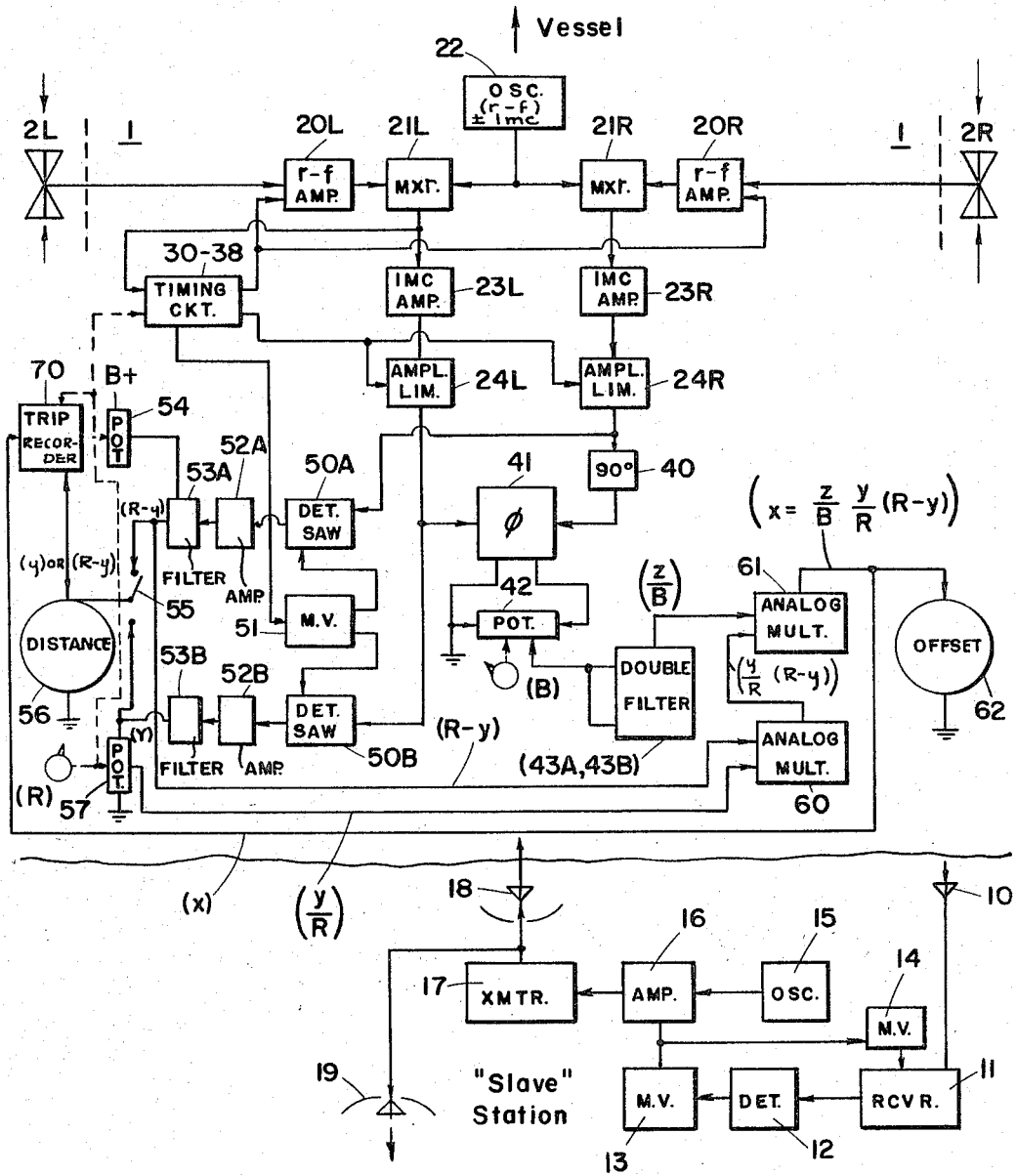
FIG. 3 is a block diagram showing the principal components of the radio range stations and shipboard radio receiver-indicator.

The range stations on shore or on offshore towers may have directional antenna arrays 18 (FIGS. 3, 4) to concentrate the beams down the channel center line and thus reduce the power requirement for a given signal strength along the range and reduce interference with other signals in the same area.

Each transmitter (FIGS. 3 and 4) may consist of a power tube 17 fed through an amplifier 16 by a stabilized oscillator 15 at the system frequency (say 60 mc.)—with the amplifier 16 gated by a multivibrator 13.

In the primary master station of the system, this may be a free-running multivibrator 13a (FIG. 4a) which delivers a pulse of appropriate length (say 1 millisecond) at the beginning of each cycle of the sytsem.

In every other station of the system, this may be a one-shot multivibrator 13b (FIG. 4b) which is triggered (through an antenna 10, receiver 11 and detector 12) by the trailing edge of the pulse from the previous station to provide a pulse of appropriate length (say 1 ms.) as the gate signal for the power tube 17. A second multivibrator 14, triggered by the trailing edge of the pulse from the first multivibrator 13b, gates the receiver 11 during the quiescent period for that range to prevent spurious triggering by pulses from neighboring ranges.

With this arrangement, the timing cycle for the system is allocated in equal portions; the portion for each range is divided between the master station and slave station pulses (say 1 ms. each); and the consecutive ranges are activated in sequence through the cycle—with the master station on each range (FIG. 4c) triggering the slave station for that range (FIG. 4d) and that station (through a properly oriented auxiliary antenna 19 (FIG. 4d)) triggering the master station for the next range.

This time separation arrangement accommodates a navigation channel of considerable complexity. With a cycle time of 100 milliseconds and with a 1-millisecond pulse for each station, for instance, the system can include 40 or more ranges. For systems with fewer ranges, a shorter cycle time may be used. For systems with more ranges or for situations requiring more than one system in the same neighborhood, the necessary further separation may be obtained by the use of two or more system frequencies and by providing the shipboard receivers with appropriate R-F filters.

The receiver-indicator equipment on the vessel's bridge (FIG. 3) may be either portable or fixed. Its laterally-spaced antenna units 2L, 2R are shown located on the port and starboard wings of the bridge. The signals at the system frequency (say 60 mc.) are brought in as by light coaxial cable to the indicator box 1 in the pilot house and may be fed through R-F amplifiers 20L, 20R into mixers 21L, 21R (FIG. 5 for details of suitable circuitry). The other input for the mixers may be provided by a stabilized local oscillaor 22 tuned (1 mc. for example) above or below the system frequency.

The outputs of the mixers are signals (say 1 mc.) which have the same phase relationships to each other as the system frequency inputs; and these outputs may be each fed through amplifiers and amplitude limiters 23L, 24L and 23R, 24R.

A time-separation circuit 30–38 (FIG. 6 for details of suitable circuitry) is used to distinguish the signals of the range being travelled from those of other ranges in the system. In this circuit, the output from one mixer 21L may be fed through a 1 mc. amplifier 30 and positive detector 31; and the trailing edge of the positive pulse may be used to trigger a one-shot multivibrator 32 to provide an appropriate gate (say 2 ms.—but with a minor adjustment 33, coupled to the range-changing switch R (FIG. 3), for range length) for the screen grids of the amplitude limiters 24L, 24R (FIG. 5). This gate permits the amplifier channels to pass the signals for that particular range. The isolation of the desired range may be provided by a second one-shot multivibrator 34 (FIG. 6) which is triggered by the trailing edge of the amplifier gate (say 2.2 ms.) and which produces a negative gate to deactivate the R-F amplifiers 20L, 20R (FIG. 5) until one pulse length (say 1 ms.) before the beginning of the next cycle.

The shift from one range to the next may be accomplished by a third one-shot multivibrator 35 (FIG. 6) which is triggered by a single impulse from the momentary closing of a range-changing key 36 (coupled to the range-changing switch R (FIG. 3) and provided with a diode and switch-discharged condenser 37 (FIG. 6) to prevent multiple triggering) and which extends the negative gate to the R-F amplifiers by an interval (say 2 ms. or 1 cycle minus 2 ms.—depending on a selection switch 38 which is coupled to the range-changing switch R (FIG. 3)) sufficient to shift the pulse reception to one or the other of the adjacent ranges—depending on whether the vessel is proceeding up or down the channel.

For the distance circuit (FIGS. 3 and 7)—the outputs of the amplitude limiters 24R, 24L may be used respectively as the inputs to negative and positive detectors 50A, 50B which take off the positive and negative envelopes of the R-F pulses for that range and provide a sawtooth recovery in the interval between these two pulses. The trailing edge of the pulse from the detector 31 in the time-separation circuit (FIG. 6) may be fed through a diode to trigger a one-shot multivibrator 51 (FIG. 7) which provides a gate of length (say 1.5 ms.) sufficient for the longest range in the system. The negative and positive outputs of the two sawtooth-recovery detectors 50A, 50B may be combined with the equal positive and negative outputs, respectively, of the multivibrator 51 so as to cancel everything during the gate period (say 1.5 ms.) except the sawtooth recovery between pulses; and these sawtooths are the input to two amplifiers 52A, 52B. The amplifier plate voltages may be fed through diodes and filter circuits 53A, 53B to produce negative and positive voltages, respectively, which are proportional to the interval between the trailing edge of the master station pulse and the leading edge of the slave-station pulse—an interval proportional in turn to the vessel's distance from the slave station.

The output ($y$) of the positive filter 53B, or the output ($-y$) of the negative filter 53A combined with the output of a linear potentiometer 54 which is coupled to the range-changing switch R (FIG. 3) to represent the distance R between stations for that particular range, may be applied through a selector switch 55 (also coupled to the range-changing switch R) and fed to an appropriate meter 56 to indicate at all times the vessel's distance ($y$ or $R-y$) from the aft range station—and the point at which the transition to the nex range should be made.

For the angle circuit (FIGS. 3 and 8)—the signals from the amplitude limiters 24L, 24R for the left and right antennas 2L, 2R (with either the left or right signal passed through a 90° phase shifter 40) may be fed into a balanced-modulator phasemeter 41 (see Terman and Pettit, Electronic Measurements, Mc-Graw-Hill, (1952) p. 273). The phasemeter output may be applied to a hyperbola-tapered potentiometer 42 (the take-off of which is preset by hand for the distance B between the vessel's receiving antennas) to produce two consecutive voltages which represent the $z'/B$ and $z''/B$ elements defined above. These voltages may be applied to positive and negative filters 43A, 43B and combined to produce an algebraic sum representing the $z/B$ element in the offset equation.

For the offset circuit (FIG. 3)—one input may be the $R-y$ element produced by the negative filter 53A and potentiometer 54 in the distance circuit as described above. A second input may be the take-off of a hyperbola-tapered potentiometer 57 in the distance circuit, coupled to the first potentiometer 54 (to reflect the R setting) and fed by the positive filter 53B so as to produce the desired $y/R$ element (FIG. 7). The remaining required input may be the $z/B$ element—produced as described above.

The $R-y$ and $y/R$ elements may be fed to an analog multiplier 60 (FIG. 3) which provides the product $$\frac{y}{R}(R-y)$$

(See Korn and Korn, Electronic Analog Computers, 2nd Ed., McGraw-Hill (1956), and I.R.E. Transactions on Electronic Computers, March 1958—design by H. Schmid.) This $$\frac{y}{R}(R-y)$$

output and the above $z/B$ element may be the inputs for a second analog multiplier 61 which produces the final D.C. voltage $$\frac{Z}{B} \cdot \frac{y}{R}(R-y) = x$$

to actuate the offset indicator meter 62. (For all meters described, the inertia of the meter needle removes any vibration from the information-pulse repetition frequency, so that the full-cycle meter reading reflects the time relationships determined during the pulses for that particular range. A small filter can be used to assist this if necessary.)

The accuracy of this system depends upon range length, beacon locations, vessel beam, system frequency, and indicator circuit characteristics—and the offset information must be adequate for safe navigation at the center of the range. For example: with a range length of 4,000 yards, beacons located 1,000 yards beyond each end of the range, a vessel beam (distance between receiving antennas) of 20 meters, a 60-mc. system frequency, and a total indicator circuit (including balanced modulator phasemeter) capable of producing discernible voltages for phase differences of as little as 1°, the offset meter registers lateral changes in the ship's position of as little as one yard. For longer ranges, any desired accuracy of the system can be achieved by increasing the sensitivity of the phasemeter or by using harmonics of the intermediate frequency for the phase comparisons.

This basic system may be expanded by various elements which further increase its usefulness to the navigator. For example: Warning buzzers and/or lights may be incorporated in the offset circuit (to notify the navigator if the vessel moves to either side of the established lane line 6a or 6b—FIG. 1) and in the distance circuit (to inform the navigator when to make the transition to the next range B4, B5 or C4, C5—FIG. 1); and the distance and offset information and range identification may be fed and coupled into a trip-recorder 70 (FIG. 3) to maintain automatically a permanent log of the vehicle's position at all times during transit of a channel.

To simplify the installation requirements, this system can be modified by making use of both light towers 4, 8 for each existing Coast Guard range and locating both range stations at one end of the range (FIG. 1). This arrangement requires a slightly revised offset equation $x = zy(R_1+y)/BR_1$.

The $z$ factor is now a voltage representing the algebraic difference between $z'$ and $z''$, produced as by the circuit shown in FIG. 8a. In this circuit, the trailing edge of the pulse from the detector 31 in the time separation circuit (FIG. 6) may be fed through a diode to trigger a one-shot multivibrator 44 (FIG. 8a) which provides a positive pulse equal in length to the range station pulse (say 1 ms.); and the trailing edge of this pulse may be used to trigger a second multivibrator 45 which provides a negative pulse of equal length and amplitude. The combined pulses may be fed into a 4-diode network 46 which is connected into the balanced-modulator phasemeter 41 and hyperbola-tapered potentiometer 42 described above for the angle circuit (FIG. 8) and which serves as a double-acting reversing switch to incorporate the $z'/B$ and $z''/B$ voltages, depending on their polarity, into the positive and negative pulse sequence. This sequence may then be fed into a filter 47 to produce a D.C. voltage which represents $z/B$ (the algebraic difference between the $z'/B$ and $z''/B$ voltages) as required for the second analog multiplier 61 (FIG. 3) in the offset circuit.

The $y$ factor is now a voltage representing the distance to the nearest station 4 on the range (FIG. 1). This can be produced as by a small separate-frequency transmitter and receiver on one bridge wing keyed respectively by the two multivibrators 44, 45 (FIG. 8a) which operate with a transponder on the nearest range station during the time segment for that range and feed the positive side 50B of the distance indicator circuit (FIG. 7). (Other traffic on the range can be accommodated as by means of a multivibrator which restricts the firing of the bridge-wing transmitter to every second, third or fourth cycle, etc., depending on the number of additional vessels.) In this arrangement, the $y/R_1$ voltage may be obtained by setting the hyperbola-tapered potentiometer 57 (FIG. 7) for the distance $R_1$ between the adjacent range stations 4, 8 (FIG. 1); and the $R_1+y$ voltage may be obtained by omitting the negative detector 50A, applying the $y$ voltage from the positive detector 50B to the upper amplifier 52A and filter 53A (with the diode reversed), and setting the potentiometer 54 for the adjacent beacon interstation distance $R_1$.

The system frequency is increased in this arrangement to compensate for the reduced angular responsiveness of the adjacent-beacon configuration.

As an added assistance in navigation, the carrier wave pulses from the range station transmitters can be modulated—and the vessel can be equipped with a second balanced-modulator phasemeter (at the modulation frequency) to provide a broad-scale offset indication.

What is claimed is:

1. A method of determining on board a vehicle its location with respect to fore and aft range stations which comprises:
   radiating from said stations time-separated signals having a time-locked characteristic,
   comparing the time relationship of the signals as received at laterally-spaced points of said vehicle from each of said stations to determine the simultaneous relative bearings of each of said stations,
   comparing the time relationship of said time-locked signals as received from each pair of said stations to determine said vehicle's distance from said stations, and
   combining said distance information and the algebraic and of said simultaneous relative bearing information to determine the lateral offset of said vehicle with respect to the base line between said stations.

2. A method of determining on board a vehicle its distance from fore and aft range stations which comprises:
   radiating from said range stations time-separated signals having a time-locked characteristic, and
   comparing the time relationship of said time-locked signals as received from each pair of said stations to determine said vehicle's distance from said stations.

3. A method of determining on board a vehicle its lateral offset with respect to the base line between fore and aft range stations which comprises:
   radiating from said stations time-separated signals having a time-locked characteristic,
   comparing the time relationship of the signals as received at laterally-spaced points of said vehicle from each of said stations to determine the simultaneous relative bearings of each of said stations,
   comparing the time relationship of said time-locked signals as received from each pair of said stations to determine said vehicle's distance from said stations; and
   combining said distance information and the algebraic sum of said simultaneous relative bearing information to determine the lateral offset of said vehicle from said base line.

4. A method of determining on board a vehicle its location with respect to an extension of the base line between two range stations which comprises:
   radiating from said stations time-separated signals,
   comparing the time relationship of the signals as received at laterally-spaced points of said vehicle to determine the simultaneous relative bearing of each of said stations,
   transmitting a synchronized frequency-separated signal from said vehicle and timing the receipt of a triggered response from the nearest range station to determine said vehicle's distance from said station, and
   combining the algebraic difference between said simultaneous relative bearing information with said distance information to determine the lateral offset of said vehicle with respect to said base line.

5. A method of determining on board a vehicle located near an extension of the base line between two range stations the simultaneous relative bearings of said stations which comprises:
   radiating from said stations time-separated signals, and
   comparing the time relationship of the signals as received at laterally-spaced points of said vehicle to determine the simultaneous relative bearing of each of said stations.

6. A method of determining on board a vehicle located near an extension of the base line between two range stations the distance from said stations which comprises:
   radiating from said stations time-separated signals, and
   transmitting a synchronized frequency-separated signal from said vehicle and timing the receipt of a triggered response from the nearest range station to determine said vehicle's distance from said station.

7. A method of determining on board a vehicle its lateral offset with respect to an extension of the base line between two range stations which comprises:
   radiating from said stations time-separated signals,
   comparing the time relationship of the signals as received at laterally-spaced points of said vehicle to determine the simultaneous relative bearing of each of said stations,
   transmitting a synchronized frequency-separated signal from said vehicle and timing the receipt of a triggered response from the nearest range station to determine said vehicle's distance from said station, and
   combining the algebraic difference between said simultaneous relative bearing information with said distance information to determine the lateral offset of said vehicle with respect to said base line.

8. A channel-navigation system comprising
at least one pair of fore and aft radio range stations having means for radiating time-separated signals having a time-locked characteristic,
signal-receiving means at laterally-spaced points of a vehicle for receiving the signals from said stations,
means on board said vehicle for comparing the phase of the signals as received by said signal-receiving means from each of said stations as a measure of the simultaneous relative bearings of said stations,
means on board said vehicle for determining the pulse arrival time relationship of said time-locked signals as received from each pair of said stations as a measure of the distance of said vehicle from said stations,
indicating means responsive to said distance signals,
means on board said vehicle for combining said distance information and the algebraic sum of said simultaneous relative bearing information as a measure of the lateral offset of said vehicle with respect to the base line between said stations, and
indicating means responsive to said offset signals.

9. A channel-navigation system comprising
at least one pair of fore and aft radio range stations having means for radiating time-separated signals having a time-locked characteristic,
signal-receiving means on board a vehicle for receiving said signals from said stations,
means on board said vehicle for determining the pulse arrival time relationship of said time-locked signals as received from each pair of stations as a measure of the distance of said vehicle from said stations, and
indicating means responsive to said distance signals.

10. A channel-navigation system comprising
at least one pair of fore and aft radio stations having means for radiating time-separated signals having a time-locked characteristic,
signal-receiving means at laterally-spaced points of a vehicle for receiving the signals from said stations,
means on board the vehicle for comparing the phase of the signals as received from each of said stations by said signal-receiving means as a measure of the simultaneous relative bearings of said stations,
means on board the vehicle for determining the pulse arrival time relationship of said time-locked signals as received from each pair of said stations as a measure of the distance of said vehicle from said stations,
means on board the vehicle for combining said distance information and the algebraic sum of said simultaneous bearing information as a measure of the lateral offset of the vehicle from the base line between said stations, and
indicating means responsive to said offset signals.

11. A channel-navigation system comprising at least one pair of radio range stations located along an extension of the channel center line and having means for radiating time-separated signals,
signal-receiving means at laterally-spaced points of a vehicle for receiving the signals from said stations,
means on board said vehicle for comparing the phase of the signals as received from each of said stations by said signal-receiving means as a measure of the simultaneous relative bearings of said stations,
means on board said vehicle for transmitting a synchronized signal at a separate frequency, means at the nearest range station for receiving this signal and transmitting a response, and means aboard said vehicle for receiving this response and determining its time relationship to the original transmission as a measure of said vehicle's distance from said station,
indicating means responsive to said distance signals,
means on board said vehicle for combining the algebraic difference between said simultaneous relative bearing information with said distance information as a measure of the lateral offset of said vehicle with respect to said channel center line, and
indicating means responsive to said offset signals.

12. A channel-navigation system comprising at least one pair of radio range stations located along an extension of the channel center line and having means for radiating time-separated signals,
signal-receiving means at laterally-spaced points of a vehicle for receiving the signals from said stations, and
means on board said vehicle for comparing the phase of the signals as received from each of said stations by said signal-receiving means as a measure of the simultaneous relative bearings of said stations.

13. A channel-navigation system comprising at least one pair of radio range stations located along an extension of the channel center line and having means for radiating time-separated signals,
signal-receiving means on a vehicle for receiving the signals from said stations,
means on board said vehicle for transmitting a synchronized signal at a separate frequency, means at the nearest range station for receiving this signal and transmitting a response, and means aboard said vehicle for receiving this response and determining its time relationship to the original transmission as a measure of said vehicle's distance from said station, and
indicating means responsive to said distance signals.

14. A channel-navigation system comprising at least one pair of radio range stations located along an extension of the channel center line and having means for radiating time-separated signals,
signal-receiving means at laterally-spaced points of a vehicle for receiving the signals from said stations,
means on board said vehicle for comparing the phase of the signals as received from each of said stations by said signal-receiving means as a measure of the simultaneous relative bearings of said stations,
means on board said vehicle for transmitting a synchronized signal at a separate frequency, means at the nearest range station for receiving this signal and transmitting a response, and means aboard said vehicle for receiving this response and determining its time relationship to the original transmission as a measure of said vehicle's distance from said station,
means on board said vehicle for combining the algebraic difference between said simultaneous relative bearing information with said distance information as a measure of the lateral offset of said vehicle with respect to said channel center line, and
indicating means responsive to said offset signals.

No references cited.

CHESTER L. JUSTUS, *Primary Examiner.*

D. C. KAUFMAN, *Assistant Examiner.*

UNITED STATES PATENT OFFICE
CERTIFICATE OF CORRECTION

Patent No. 3,302,203                          January 31, 1967

Peter P. Schauffler

It is hereby certified that error appears in the above numbered patent requiring correction and that the said Letters Patent should read as corrected below.

Column 1, line 25, for "severly" read -- severely --; column 5, line 38, for "or (the" read -- or the --; line 74, for "nex" read -- next --; column 7, line 75, for "and" read -- sum --.

Signed and sealed this 8th day of October 1968.

SEAL)
Attest:

Edward M. Fletcher, Jr.                      EDWARD J. BRENNER

Attesting Officer                              Commissioner of Patents